United States Patent
Morris

(10) Patent No.: US 7,516,188 B2
(45) Date of Patent: Apr. 7, 2009

(54) SYSTEM USING SELECTED CONTROLLER FOR SHARING AND DIRECTING WEB CONTENT IN REAL TIME AMONG NETWORK DEVICES

(75) Inventor: Robert P. Morris, Raleigh, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 1076 days.

(21) Appl. No.: 10/868,431

(22) Filed: Jun. 14, 2004

(65) Prior Publication Data

US 2006/0041678 A1    Feb. 23, 2006

(51) Int. Cl.
*G06F 15/16* (2006.01)
(52) U.S. Cl. ...................... 709/208; 709/219
(58) Field of Classification Search ................. 709/219, 709/217, 218, 209, 229, 225, 203, 224, 242, 709/208; 379/102.1
See application file for complete search history.

(56) References Cited

U.S. PATENT DOCUMENTS

| | | | |
|---|---|---|---|
| 5,710,605 A | 1/1998 | Nelson | 348/734 |
| 6,476,825 B1 | 11/2002 | Croy et al. | 345/716 |
| 6,772,209 B1* | 8/2004 | Chernock et al. | 709/225 |
| 7,219,153 B1* | 5/2007 | Day | 709/229 |
| 2003/0236906 A1 | 12/2003 | Klemets et al. | |
| 2004/0010588 A1* | 1/2004 | Slater et al. | 709/224 |
| 2004/0019634 A1* | 1/2004 | Van Geldern et al. | 709/203 |
| 2004/0078484 A1* | 4/2004 | Parry et al. | 709/242 |
| 2005/0123109 A1* | 6/2005 | Yamagishi et al. | 379/102.01 |

FOREIGN PATENT DOCUMENTS

WO    WO 02/086714    10/2002

* cited by examiner

*Primary Examiner*—Le Luu

(57) ABSTRACT

A method and system for directing content to a plurality of devices provide one of the devices as a controller, form a network between the controller and other devices of the plurality of devices, and send from the controller to the other devices a play request for the content. The play request includes a content source address and a content type. The other devices can locate a content source using the content source address and receive the content. The controller and the other devices can then play the received content. In this manner, a network of devices can be formed for the purpose of sharing or directing content in real-time. The other devices can be directed to receive the content directly from the content source or through the controller. Alternatively, the controller can be the content source. The ease and efficiency in which content is shared is thus significantly increased.

33 Claims, 5 Drawing Sheets ered and displayed on the controller. In this manner, a network of devices can be formed for the purpose of sharing or directing content in real-time.

SYSTEM USING SELECTED CONTROLLER FOR SHARING AND DIRECTING WEB CONTENT IN REAL TIME AMONG NETWORK DEVICES

FIELD OF THE INVENTION

The present invention relates to multiple networked devices, and more particularly to the sharing and directing of content in real-time among multiple networked devices.

BACKGROUND OF THE INVENTION

In the current state of the art, many mobile devices are capable of receiving and displaying images and video streams for movies and television. However, the screens on these mobile devices are typically small. Thus, the display of the images cannot be easily shared. Even if these images are transmitted to another device, such as by "beaming" the image from one mobile device to another using their infrared ports, these images must typically be manually transmitted to one device at a time, without any coordination of multiple devices.

Accordingly, there exists a need for a method and system for directing content to multiple networked devices in real-time. The method and system should allow for the dynamic formation of the network, where content can be shared among the devices in the network in real-time. The present invention addresses such a need.

SUMMARY OF THE INVENTION

A method and system for directing content to a plurality of devices is provided. The method and system provide one of the devices as a controller, form a network between the controller and other devices of the plurality of devices, and send from the controller to the other devices a play request for the content. The play request includes a content source address and a content type. The other devices can locate a content source using the content source address and receive the content. The controller and the other devices can then play the received content. In this manner, a network of devices can be formed for the purpose of sharing or directing content in real-time. The other devices can be directed to receive the content directly from the content source or through the controller. Alternatively, the controller can be the content source. The ease and efficiency in which content is shared is thus significantly increased.

DETAILED DESCRIPTION

The present invention provides a method and system for directing content to multiple networked devices in real-time. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 5 in conjunction with the discussion below.

Figure 1:
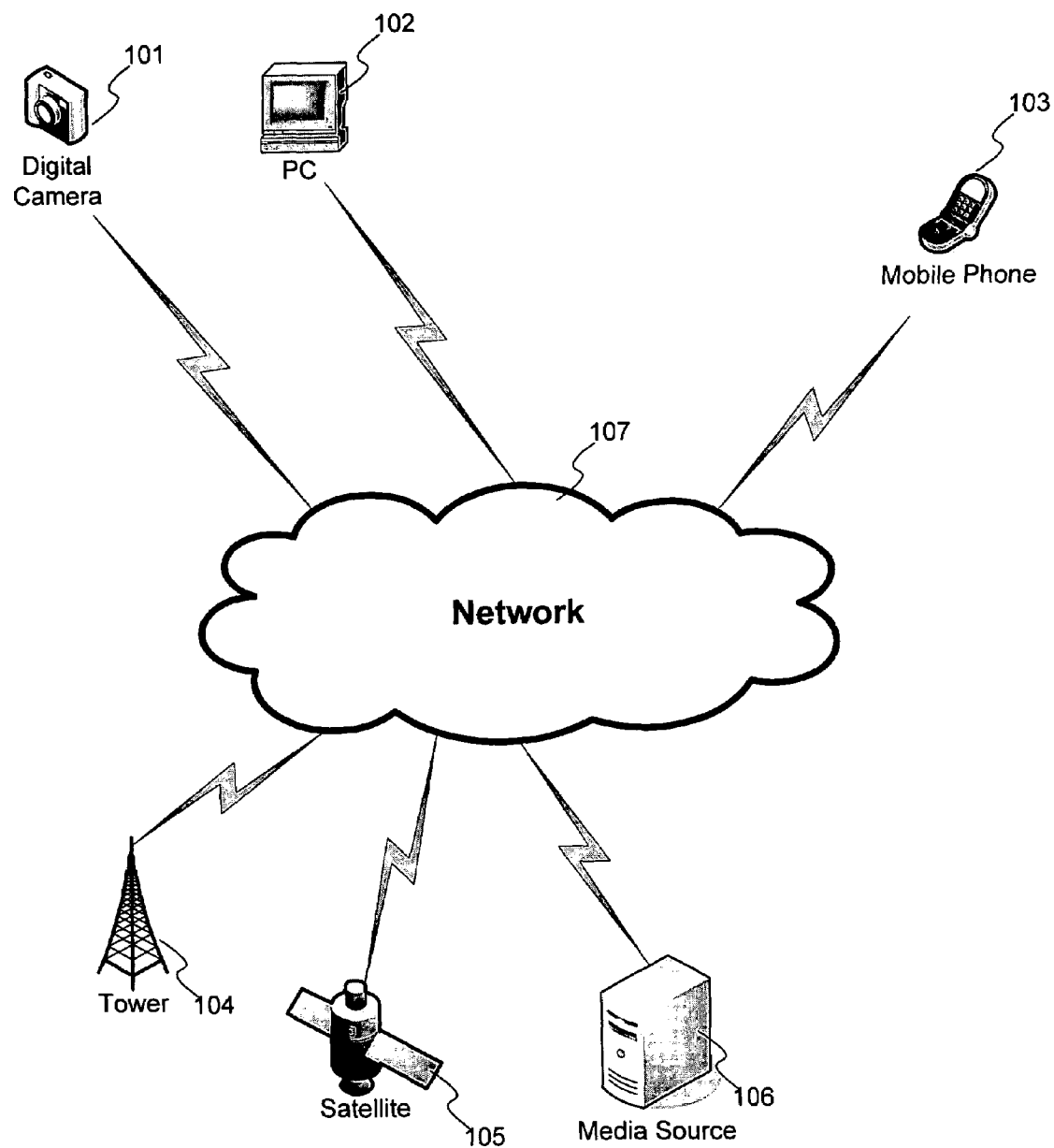
FIG. 1 illustrates one preferred embodiment of a system for directing content to multiple networked devices in accordance with the present invention.

FIG. 1 illustrates one preferred embodiment of a system for directing content to multiple networked devices in accordance with the present invention. In this embodiment, the system includes a plurality of devices 101-103, such as a digital camera 101, a personal computer (PC) 102, and a mobile phone 103, capable of communicating with each other and forming a network. The network can be of any type, such as a local area network, a wide area network, an intranet, or a Bluetooth™ piconet. One or more of the devices 101-103 is designated as the controller. This can be negotiated among the devices 101-103, done by request of one of the devices 101-103, configured and set by user preference, or by a permanent relationship established between the devices 101-103. The controller displays control menus and information that may or may not be displayed on the other devices, as determined by the user of the controller. Each of the devices 101-103 is also capable of connecting to any of a plurality of content sources 104-106 via a network 107. Example content sources include a tower 104 for radio or television signals, a satellite 105, and a media source 106. An example of the network 107 includes the Internet.

Figure 2:
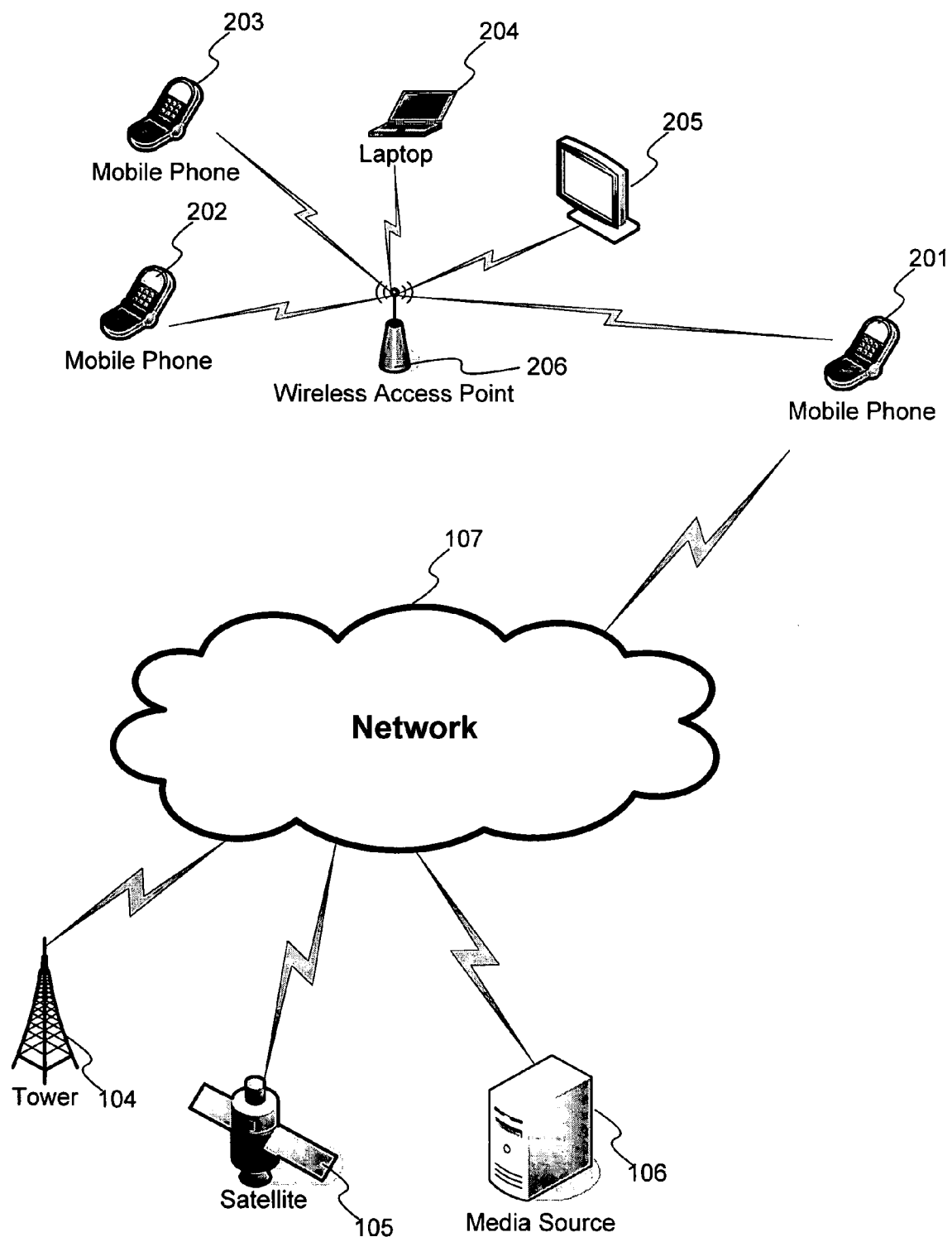
FIG. 2 illustrates another preferred embodiment of a system for directing content to multiple networked devices in accordance with the present invention.

FIG. 2 illustrates another preferred embodiment of a system for directing content to multiple networked devices in accordance with the present invention. In this embodiment, the system includes a plurality of devices 201-206, such as mobile phones 201-203, a laptop computer 204, and a television 205, capable of communicating with each other in the same manner as described above with FIG. 1 via access point 206 Any of these devices is capable of functioning as a controller with the capability of connecting to any of the content sources 104-106 via the network 107. As the controller, any of the devices 201-205 functions as a common access point to the content sources 104-106 via the network 107. Alternatively, one of the devices, such as mobile phone 201, can function both as the controller and as the content source, if the data to be shared with the other devices 202-205 is stored at the device 201.

Figure 3:
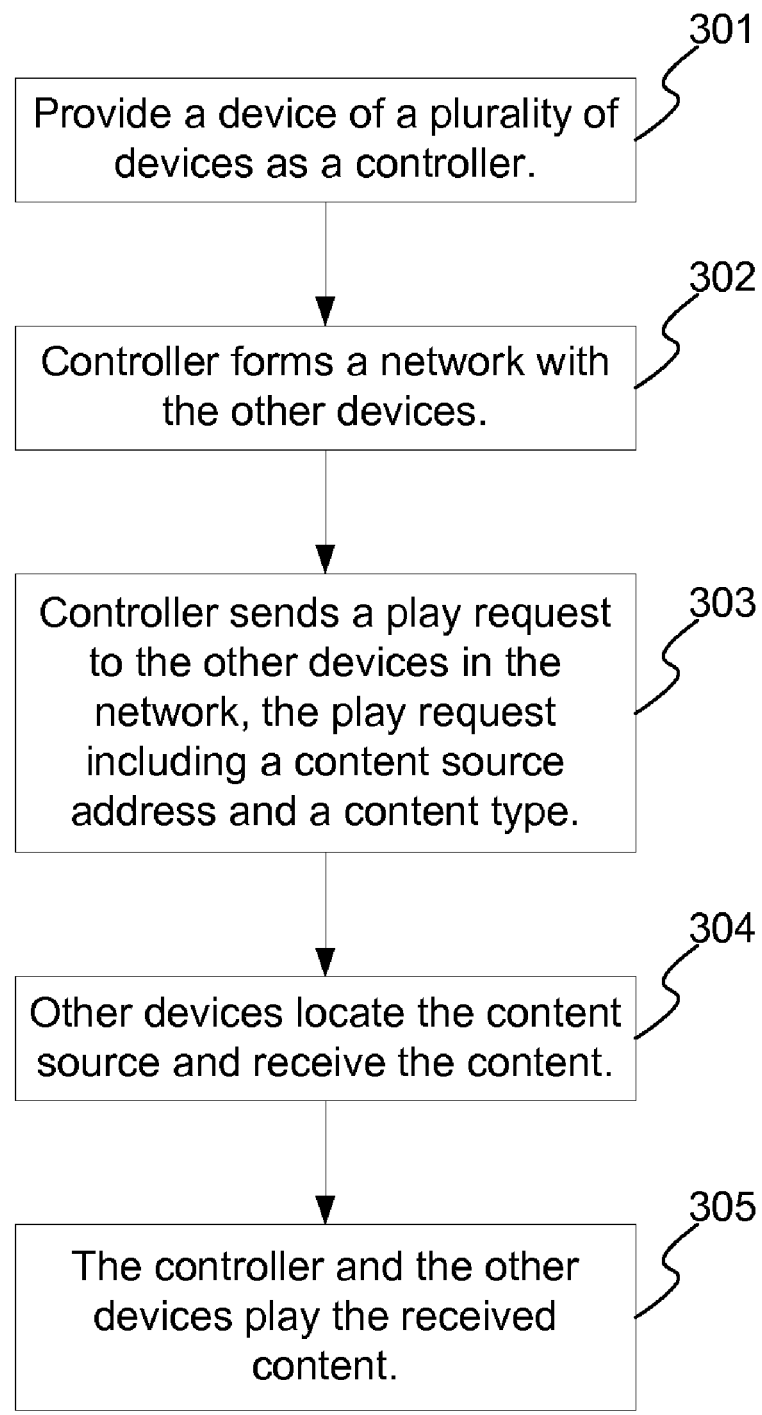
FIG. 3 is a flowchart illustrating a preferred embodiment of a method for directing content to multiple networked devices in accordance with the present invention.

FIG. 3 is a flowchart illustrating a preferred embodiment of a method for directing content to multiple networked devices in accordance with the present invention. First, a device of a plurality of devices is provided as a controller, via step 301. Next, the controller forms a network with the other devices, via step 302. The controller then sends a play request to the other devices in the network, via step 303. The play request includes a content source address, a content type, and any other necessary information. The other devices each locates the content source and receives the content, via step 304. The other devices can receive the content by connecting directly with the content source or through the controller as the access point. The controller and the other devices then each play the received content, via step 305.

For example, referring to both FIGS. 1 and 3, assume that the mobile phone 103 is provided as the controller, via step 301. The mobile phone 103 forms a network with the digital camera 101 and the PC 102, via step 302. If the relationship between the mobile phone 103 and the other devices 101-102 is fixed, then the devices 101-102 are hardwired to the mobile phone 103 or are configured to always accept controls from the mobile phone 103. If the relationship is dynamic, then the mobile phone 103 can send control requests to the other devices 101-102 to invite them to join the mobile phone's network. Other ways of forming the network are possible. Once the network is formed, the mobile phone 103 sends a play request to the other devices 101-102, via step 303. The play request includes a content source address, a content type, and initial synchronization data (if needed). Assume in this example that the content type is streaming video and the content source is the media source 106. The other devices 101-102 locate the media source 106, connect to it via the network 107, and receive the streaming video, via step 304. Once received, the mobile phone 103, the digital camera 101, and the PC 102 play the streaming video, via step 305.

For another example, referring to both FIGS. 2 and 3, assume that the mobile phone 201 is provided as the controller, via step 301. The mobile phone 201 forms a network with the other devices 202-205, via step 302. The relationship between the mobile phone 201 and the other devices 202-205 can be fixed or dynamic, as described above. Once the network is formed, the mobile phone 201 sends a play request to the other devices 202-205, via step 303. The play request includes a content source address, a content type, and initial synchronization data (if needed). Assume in this example that the content type is digital images and the content source is an on-line photo album at the media source 106. The other devices 202-205 locate the media source 106 and connect to it through the mobile phone 201 via the common access point 206. The other devices 202-205 then receive the images from the mobile phone 201, via step 304. Once received, the devices 201-205 display the images, via step 305.

Figure 4A:
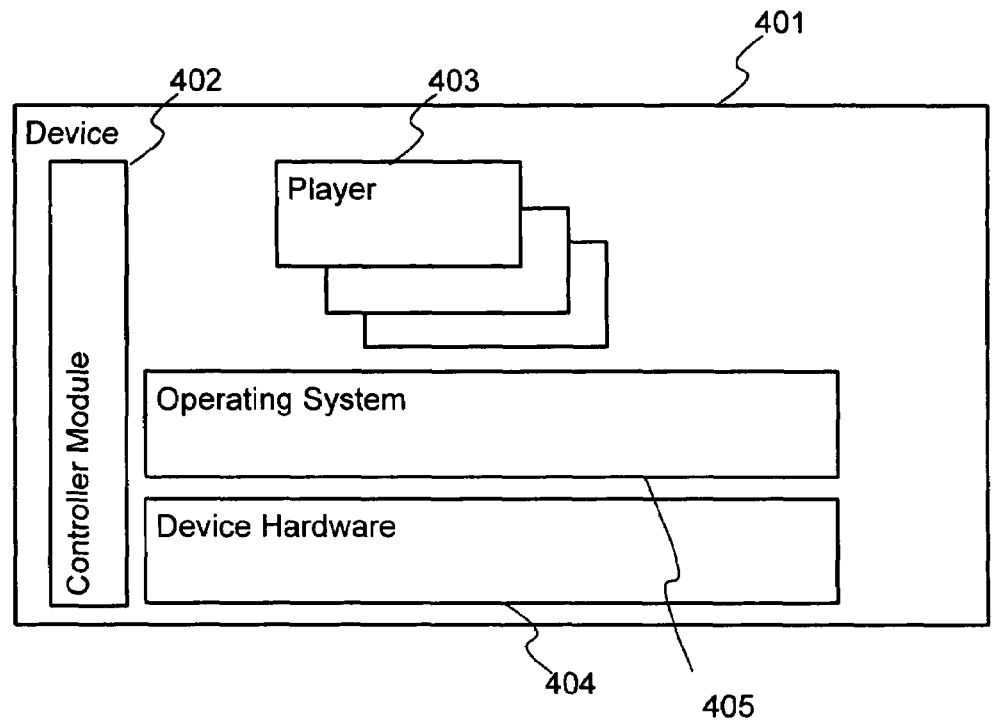
FIGS. 4A and 4B illustrate preferred embodiments of a device comprising components for directing content to multiple networked devices in accordance with the present invention.
Figure 4B:
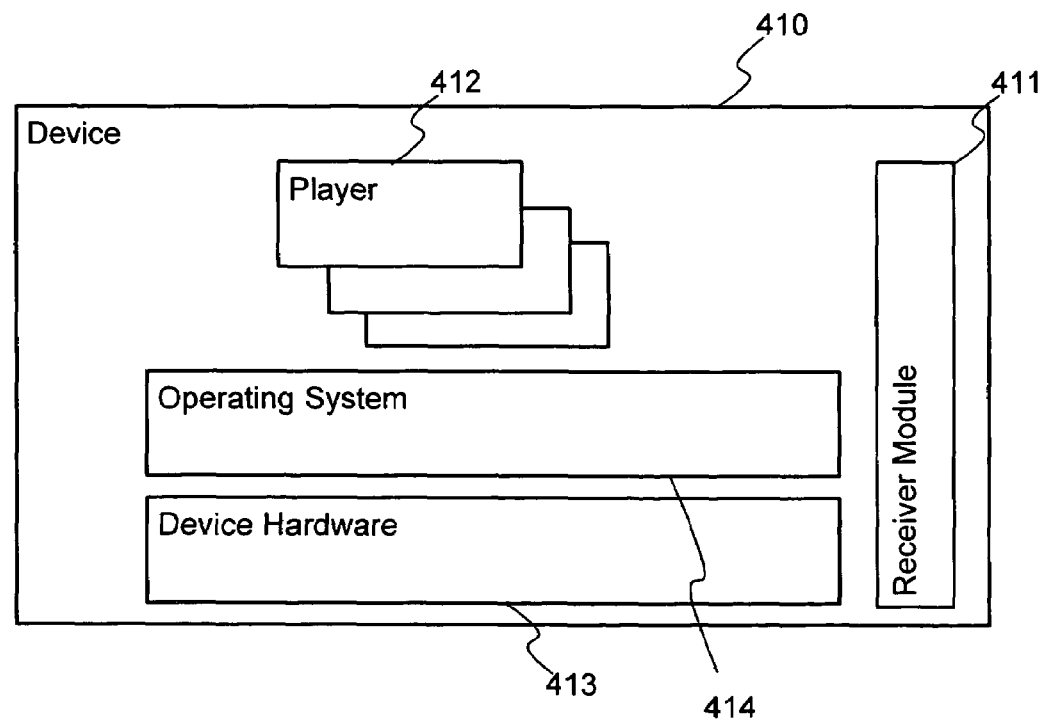

FIGS. 4A and 4B illustrate preferred embodiments of a device comprising components for directing content to multiple networked devices in accordance with the present invention. FIG. 4A illustrates the components for a device functioning as a controller. FIG. 4B illustrates the components for a device functioning as a receiver. Referring to FIG. 4A, the device 401 includes a controller module 402, a plurality of players 403, device hardware 404, and an operating system 405. The controller module 402 is software and/or hardware that implements the device's role as a controller. The players 403 include the software and/or hardware required for the device 401 to play various content types. For example, the device 401 would include a player for streaming video, a player for digital music, a player for a television signal, etc. The device hardware 404 and operating system 405 includes other hardware and software required for the device 401 to function.

Referring to FIG. 4B, the device 410 includes a receiver module 411, a plurality of players 412, device hardware 413, and an operating system 414. The receiver module 411 is software and/or hardware to implement a device's role as a receiver of requests from the controller. The players 412 include the software and/or hardware required for the device 410 to play various content types. The device hardware 413 and operating system 414 include other hardware and software required for the device 410 to function.

A device can also include both the controller module 402 and the receiver module 411, allowing it to play either role for any particular network, without departing from the spirit and scope of the present invention.

Figure 5:
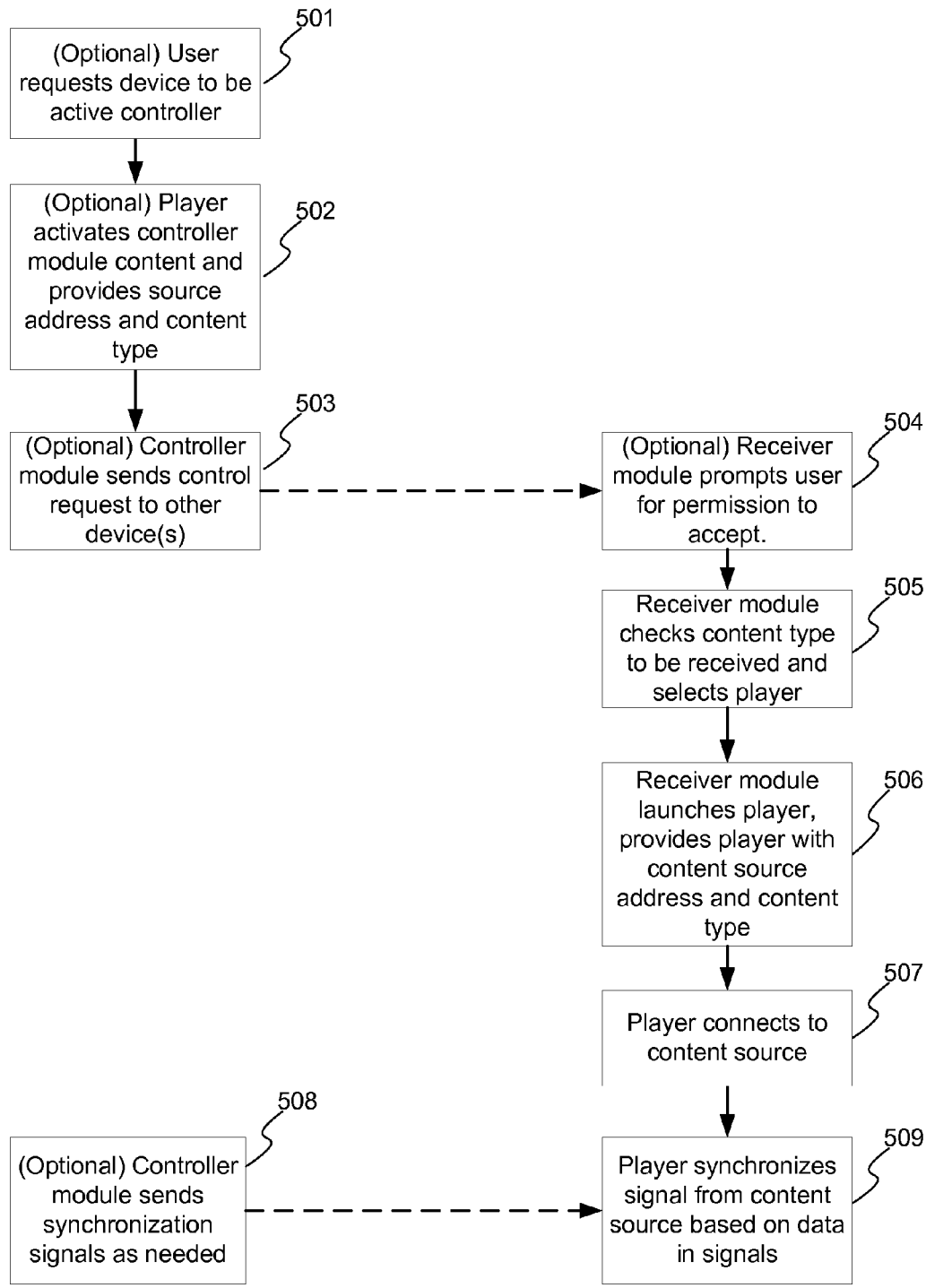
FIG. 5 is a flowchart illustrating in more detail the method for directing content to multiple networked devices in accordance with the present invention.

FIG. 5 is a flowchart illustrating in more detail the method for directing content to multiple networked devices in accordance with the present invention. First, a user requests for a device 401 to be an active controller, via 501. Typically, this occurs while the device 401 is playing some type of media. The player 403 of the media activates the controller module 402 and provides a content source address and a content type of the media being played, via step 502. The controller module 402 sends a control request to other devices to invite them to join the controller's network, via step 503. The invitation can be sent to any other devices on its local network or to a list of select devices. When a fixed relationship exists between the controller and the other device, the invitation is implicit, and steps 501-503 need not be performed.

The receiver module 411 of the other device receives the control request, and optionally prompts the user for permission to accept the invitation, via step 504. Alternatively, the receiver module 411 can be configured to automatically accept or reject invitations from the controller module 402. Once the receiver module 411 joins the controller's network, it checks the content type to be received, contained in the control request, and selects the appropriate player 412, via step 505. The receiver module 411 then launches the selected player 412 and provides the player 412 with the content source address and content type, via step 506. The player 412 connects to the indicated content source, via step 507. When the media requires a synchronization signal for the devices to keep them in lock step, the controller module 402 sends the synchronization signals as needed, via step 508, and the player 412 synchronizes the feed from the content source based on the data in the signals, via step 509.

For example, assume that a fixed relationship exists between a remote control and a television. The remote control contains the controller module 402, while the television contains the receiver module 411. Here, the remote control includes a screen for displaying a television signal. The remote control connects to a source of the television signal, receives the signal, and displays it on its screen. A user of the remote control can then "channel surf" on the remote control without affecting what is displayed on the television. Once the user decides which channel to view, the user indicates to the controller module 402 that it should synchronize with controlled devices. The controller module 402 in the remote control sends a control request to the receiver module 411 in the television, via step 503, which includes the television channel to display. The receiver module 411 connects to the content source of the television signal, via steps 505-506, receives the signal, via step 507, and displays the selected channel. Thus, the channel surfing occurs on the remote control, not the television.

For another example, assume that a user is watching a movie on a mobile phone at a coffee shop. Several friends are interested and want to view the movie as well on their respective devices. They create a local network, such as a piconet, where the devices negotiate which device is to be the controller. Assume that the user's mobile phone is determined to be the controller. The controller module 402 in the mobile phone is then activated, via step 502, and is provided the uniform resource locator (URL) of the video signal and the content type. The controller module 402 sends the URL of the video signal to the other devices, via step 503. The receiver modules 411 in the other devices receive the URL, check the content type to be received, and select the appropriate player 412, via step 505. The receiver modules 411 then launch their respective players 412, providing them with the URL of the video signal and the content type, via step 506. The players 412 request the video signal from the URL, via step 507. If needed, the controller module 402 periodically broadcasts a timestamp to the other devices, via step 508, which use the timestamp to synchronize the display of the video in their displays with the display on the mobile phone, via step 509.

For another example, assume that a user is viewing images stored on a personal digital assistant (PDA) and wants to share the images with a friend. The user requests that the PDA be the active controller, via step 501. The player 403 in the PDA activates the controller module 402 and provides the image source address and the image type, via step 502. In this example, the image source address is for the PDA itself. The controller module 402 sends a control request to the friend's device, via step 503. The friend's device beeps when it receives the control request, and prompts the friend for permission to accept, via step 504. Assume that the friend accepts, and the friend's device joins the PDA's network. The receiver module 411 in the friend's device checks the image type to be received and selects its image player 412, via step 505. The receiver module 411 launches the image player 412 and provides the image source address and image type, via step 506. The player 412 then connects to the PDA as the image source, via step 507. The PDA can then transmit its images to the friend's device, where they are displayed. The user can navigate through a set of images on the PDA and talk, with the images displaying on the friend's device as the user navigates and the user's voice being heard on the friend's device as he speaks.

A method and system for directing content to multiple networked devices has been disclosed. The method and system provide one of the devices as a controller, form a network between the controller and other devices of the plurality of devices, and send from the controller to the other devices a play request for the content. The play request includes a content source address and a content type. The other devices can locate a content source using the content source address and receive the content. The controller and the other devices can then play the received content. In this manner, a network of devices can be formed for the purpose of sharing or directing content in real-time. The other devices can be directed to receive the content directly from the content source or through the controller. Alternatively, the controller can be the content source. The ease and efficiency in which content is shared is thus significantly increased.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for directing content to a plurality of devices, comprising:
   providing a device of the plurality of devices as a controller, wherein the providing comprises negotiating among the plurality of devices that the device is to be the controller;
   forming a network between the controller and other devices of the plurality of devices; and
   sending from the controller to the other devices a play request for the content, the play request including a content source address of a content source and a content type such that the other devices can locate the content source and receive the content, wherein the controller and the other devices can play the received content.

2. The method of claim 1, wherein the negotiating comprises:
   requesting the device to be the controller; and
   activating a controller module in the controller, wherein the content source address and the content type is provided to the controller module.

3. The method of claim 1, wherein the negotiating comprises:
   selecting the device as the controller based on user preferences.

4. The method of claim 1, wherein the forming comprises:
   sending a control request from the controller to the other devices to invite the other devices to join the network.

5. The method of claim 4 wherein the sending of the control request is not solicited by the other devices.

6. The method of claim 1, wherein the controller is the content source.

7. The method of claim 1, wherein the controller sends synchronization signals to the other devices.

8. The method of claim 1 wherein the play request is not solicited by the other devices of the plurality of devices.

9. A system for directing content to a plurality of devices, comprising:
   a network comprising the plurality of devices, wherein the plurality of devices negotiates that a device of the plurality of devices is to be a controller; and
   at least one content source, wherein the controller sends to other devices of the plurality of devices a play request, the play request comprising a content source address of the at least one content source and a content type such that the other devices locate the at least one content source and receive the content, wherein the controller and the other devices play the received content.

10. The system of claim 9, wherein the controller comprises a controller module, wherein the controller module is activated and provided the content source address and the content type.

11. The system of claim 9, wherein the device is selected to be the controller based on user preferences.

12. The system of claim 9, wherein the controller sends a control request to the other devices to invite the other devices to join the network.

13. The system of claim 9, wherein each of the other devices comprises a receiver module and a player for the content, wherein the receiver module for each of the other devices checks the content type, selects the player, and provides the player with the content source address and the content type, wherein the player for each of the other devices connects to the at least one content source.

14. The system of claim 13, wherein the player for each of the other devices receives the content from the at least one content source and plays the received content.

15. The system of claim 9, wherein the controller is the content source.

16. The system of claim 9, wherein the controller sends synchronization signals to the other devices.

17. The system of claim 9 wherein the controller serves as an access point to a content provider.

18. The system of claim 9 wherein the controller is part of a first formed network and at least one other device of the plurality of devices is part of a second formed network.

19. The system of claim 9 wherein the controller comprises a mobile computing device.

20. The system of claim 9 wherein the play request is not solicited by the other devices of the plurality of devices.

21. A computer readable storage medium with program instructions for directing content to a plurality of devices, comprising instructions for:
 providing a device of the plurality of devices as a controller, wherein the providing comprises negotiating among the plurality of devices that the device is to be the controller;
 forming a network between the controller and other devices of the plurality of devices; and
 sending from the controller to the other devices a play request for the content the play request including a content source address of a content source and a content type such that the other devices can locate the content source and receive the content, wherein the controller and the other devices can play the received content.

22. The computer readable storage medium of claim 21, wherein the negotiating comprises instructions for:
 requesting the device to be the controller; and
 activating a controller module in the controller, wherein the content source address and the content type is provided to the controller module.

23. The computer readable storage medium of claim 21, wherein the negotiating comprises instructions for:
 selecting the device to be the controller based on user preferences.

24. The computer readable storage medium of claim 21, wherein the forming instruction comprises instructions for:
 sending a control request from the controller to the other devices to invite the other devices to join the network.

25. The computer readable storage medium of claim 21 having further instructions for sending synchronization signals to the other devices.

26. A method for at least one device of a plurality of devices to receive content, comprising:
 forming a network between a controller and the at least one device of the plurality of devices, the controller selected by negotiating among the plurality of devices that a device is to be the controller;
 receiving a play request for the content from the controller, the play request including a content source address of a content source and a content type;
 locating the content source; and
 receiving the content, wherein the controller and the at least one device of the plurality of devices plays the received content.

27. The method of claim 26, further comprising:
 in each of the at least one device of the plurality of devices:
  selecting a player for the content type;
  providing the player with the content source address and the content type; and
  connecting to the content source by the player.

28. The method of claim 27, further comprising:
 receiving the content from the content source by the player in each of the at least one device of the plurality of devices; and
 playing the received content by the player in each of the at least one device of the plurality of devices.

29. The method of claim 27 wherein selecting the player comprises selecting one of a streaming video player, a digital music player, and a television signal player.

30. The method of claim 26 wherein the controller is the content source and receiving the content comprises receiving the content from the controller.

31. The method of claim 26 further comprising prompting a user of the at least one device of the plurality of devices for permission to accept the play request.

32. The method of claim 26 wherein the controller is configured to present the content on the controller as the received content is being presented on the at least one device of the plurality of devices.

33. The method of claim 26 wherein the play request is an unsolicited request.

* * * * *